(12) United States Patent
Um et al.

(10) Patent No.: US 10,466,518 B2
(45) Date of Patent: Nov. 5, 2019

(54) DRIVING METHODS AND DRIVING APPARATUSES FOR A DISPLAY PANEL (71) Applicant: BOE TECHNOLOGY GROUP CO., LTD., Beijing (CN)

(72) Inventors: Yoon Sung Um, Beijing (CN); Liwei Liu, Beijing (CN); Zheng Fang, Beijing (CN); Yue Jia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/795,206

(22) Filed: Oct. 26, 2017

(65) Prior Publication Data
US 2018/0284510 A1 Oct. 4, 2018

(30) Foreign Application Priority Data
Mar. 28, 2017 (CN) .......................... 2017 1 0195697

(51) Int. Cl.
*G02F 1/133* (2006.01)
*G02F 1/1362* (2006.01)
*G02F 1/1368* (2006.01)
*G09G 3/00* (2006.01)
*G09G 3/36* (2006.01)

(52) U.S. Cl.
CPC ........ *G02F 1/13306* (2013.01); *G02F 1/1368* (2013.01); *G02F 1/136286* (2013.01); *G09G 3/00* (2013.01); *G09G 3/3607* (2013.01); *G09G 3/3655* (2013.01); *G02F 2201/121* (2013.01); *G02F 2201/123* (2013.01); *G09G 2300/0447* (2013.01); *G09G 2300/0465* (2013.01); *G09G 2320/0242* (2013.01)

(58) Field of Classification Search
CPC .......... G02F 1/13306; G02F 1/136286; G02F 1/1368; G02F 2201/121; G02F 2201/123; G02F 1/134363; G09G 3/3607; G09G 3/2003; G09G 3/00; G09G 3/3655; G09G 2300/0447; G09G 2300/0465; G09G 2320/0242
See application file for complete search history.

(56) References Cited

U.S. PATENT DOCUMENTS

| 2002/0080101 A1* | 6/2002 | Asao .................... G09G 3/3648 345/87 |
| 2008/0180370 A1* | 7/2008 | Huang ................ G09G 3/3607 345/87 |

(Continued)

*Primary Examiner* — Richard J Hong
(74) *Attorney, Agent, or Firm* — Kinney & Lange, P.A.

(57) ABSTRACT

The embodiments of the present disclosure provide a driving method and driving apparatus of a display panel. The driving method comprises: dividing a driving period into N sub-periods, each of which is further divided into a first time period and a second time period, where N is a positive integer greater than or equal to 1; and applying a first common voltage to a first common electrode in the first time period and applying a second common voltage to the first common electrode in the second time period, wherein the second time period is longer than the first time period in duration. In the present disclosure, a common voltage in a modulation mode is applied to the first common electrode, so that an average arrangement direction of liquid crystal molecules in a pixel unit changes in a driving period.

20 Claims, 3 Drawing Sheets

(56) References Cited

U.S. PATENT DOCUMENTS

2009/0284674 A1* 11/2009 Chang ............... G02F 1/133707
349/38
2015/0177571 A1* 6/2015 Yoshida ............ G02F 1/134363
349/33
2018/0090081 A1* 3/2018 Nishimura ........... G09G 3/2003

* cited by examiner

DRIVING METHODS AND DRIVING APPARATUSES FOR A DISPLAY PANEL

CROSS-REFERENCE TO RELATED APPLICATION(S)

The present application claims priority to the Chinese Patent Application No. 201710195697.6, filed on Mar. 28, 2017, entitled "DRIVING METHODS AND DRIVING APPARATUSES FOR A DISPLAY PANEL," which is incorporated herein by reference in its entirety.

TECHNICAL FIELD

The present disclosure relates to the field of display technology, and more particularly, to a driving method and a driving apparatus of a display panel.

BACKGROUND

Currently, display modes of Thin Film Transistor-Liquid Crystal Displays (TFT-LCDs) may be divided into a Twisted Nematic (TN) mode, an In Plane Switching (IPS) mode, an Advanced Super Dimension Switch (ADS) mode, a Vertical Alignment (VA) mode, etc. In the wide viewing angle display technique, the VA mode has a greater viewing angle performance than the TN mode, and further has characteristics such as excellent reaction time and high contrast etc. As a result, the VA mode is widely applied in wide viewing angle liquid crystal display panels.

A VA mode display panel comprises a plurality of pixel units, each of which corresponds to a minimum display point which may be independently controlled on a display screen. Liquid crystal molecules may change from being arranged vertically (i.e., in a direction perpendicular to a surface of the display panel) to being inclined in a specific direction under the control of a driving voltage. As a light filtering capacity of a liquid crystal layer is determined by an angle between liquid crystal molecules and light, if liquid crystal molecules in a certain pixel unit are aligned in the same direction, brightness of the pixel unit appears to be different at different positions, and thus there is a color washout problem at a large viewing angle in the VA mode. In order to solve the color washout problem, there is proposed a multi-domain technique in the related art. The multi-domain technique is to divide each pixel unit into a plurality of domains, wherein liquid crystal molecules in each of the domains are aligned in the same direction and liquid crystal molecules in different domains are aligned in different directions (in different alignments and/or at angles of inclination). Due to the average of the domains, a brightness difference of the pixel unit at different viewing angles can be reduced. There are two classes of methods to divide the pixel unit into domains. One class of methods is to change alignment of the liquid crystal molecules (that is, set multiple alignment domains). It can be realized by setting bumps or different alignment layers, or by changing a shape of the pixel electrode, etc. The other class of methods is to provide a plurality of sub-pixel electrodes having different voltages in each pixel unit (i.e., the plurality of sub-pixel electrodes are commonly used to display content of one pixel), so that liquid crystal molecules corresponding to the different sub-pixel electrodes are aligned differently. Of course, the two classes of methods may be used in combination. That is, each pixel unit has multiple sub-pixel electrodes, and each sub-pixel electrode then corresponds to a plurality of alignment domains.

Currently, with regard to a pixel unit which may be divided into a number of (for example, 8) domains, there are proposed techniques such as capacitive coupling, charge sharing, or 2D1G/2G1D etc. in the related art. The inventor of the present application has found that the techniques in the related art have problems such as complex structure, low aperture ratio and increased cost etc. For example, in the 2D1G/2G1D technique, two signal lines are used to input signals. In this case, not only a number of the signal lines is doubled, but also a number of conversion chips such as Chip on Flexes (COFs) connected to the signal lines is doubled, resulting in an increased cost of a panel. As another example, in the capacitive coupling and charge sharing techniques, three thin film transistors and corresponding capacitors are required in each pixel unit, which results in a complex structure and a low aperture rate.

SUMMARY

The embodiments of the present disclosure provide a driving method and driving apparatus of a display panel, to at least partly solve the problems in the related art.

The embodiments of the present disclosure provide a driving method for a display panel, wherein the display panel comprises an array substrate, an opposite substrate and a liquid crystal layer disposed between the array substrate and the opposite substrate, the array substrate comprises a pixel electrode and a first common electrode, the pixel electrode is insulated from the first common electrode and is overlapped with the first common electrode in a direction perpendicular to the array substrate, the opposite substrate comprises a second common electrode, and the second common electrode and the pixel electrode are configured to drive liquid crystal molecules when being applied with a voltage, the driving method comprising:

dividing a driving period into N sub-periods, each of which is further divided into a first time period and a second time period, where N is a positive integer greater than or equal to 1; and applying a first common voltage to the first common electrode in the first time period and applying a second common voltage to the first common electrode in the second time period.

Alternatively, the second time period is longer than the first time period in duration.

Alternatively, a ratio of duration of the first time period to duration of the second time period is between 1:1.5 and 1:3.

Alternatively, the first common voltage is a high level common voltage, and the second common voltage is a low level common voltage.

Alternatively, the array substrate further has a gate line, a data line and a thin film transistor disposed thereon, and the driving method further comprises:

receiving, by the gate line, a scanning signal;

causing the thin film transistor to be turned on so that a data voltage is transmitted from the data line to the pixel electrode; and receiving, by the gate line, a turn-off signal, wherein a rising edge of the first common voltage is after a falling edge of the turn-off signal, or the rising edge of the first common voltage is before a rising edge of the scanning signal.

The embodiments of the present disclosure further provide a driving apparatus of a display panel, wherein the display panel comprises an array substrate, an opposite substrate and a liquid crystal layer disposed between the array substrate and the opposite substrate, the array substrate comprises a pixel electrode and a first common electrode, the pixel electrode is insulated from the first common electrode and is overlapped with the first common electrode in a direction perpendicular to the array substrate, the opposite substrate comprises a second common electrode, and the second common electrode and the pixel electrode are configured to drive liquid crystal molecules when being applied with a voltage, the driving apparatus comprising:

a time division circuit configured to divide a driving period into N sub-periods, each of which is further divided into a first time period and a second time period, where N is a positive integer greater than or equal to 1; and a common electrode driving circuit configured to apply a first common voltage to the first common electrode in the first time period and apply a second common voltage to the first common electrode in the second time period.

Alternatively, the second time period is longer than the first time period in duration.

Alternatively, a ratio of duration of the first time period to duration of the second time period is between 1:1.5 and 1:3.

Alternatively, the first common voltage is a high level common voltage, and the second common voltage is a low level common voltage.

Alternatively, the array substrate further has a gate line, a data line and a thin film transistor disposed thereon, and the driving apparatus further comprises:

a gate line driving circuit configured to provide a scanning signal and a turn-off signal to the gate line;

a data driving circuit configured to transmit a data voltage to the pixel electrode through the data line when the thin film transistor is turned on, wherein a rising edge of the first common voltage is after a falling edge of the turn-off signal, or the rising edge of the first common voltage is before a rising edge of the scanning signal.

The embodiments of the present disclosure further provide a display apparatus, comprising the driving apparatus of a display panel described above.

Other features and advantages of the present disclosure will be set forth in the description of the specification that follows and will be partly apparent from the description of the specification, or may be learned by practice of the present disclosure. The purposes and other advantages of the embodiments of the present disclosure may be realized and attained by the structure particularly pointed out in the specification, the claims and the accompanying drawings.

BRIEF DESCRIPTION OF THE DRAWINGS

The accompanying drawings, which are intended to provide a further understanding of the technical solutions of the present disclosure and form a part of the specification, are used in conjunction with the embodiments of the present application to explain the technical solutions of the present disclosure and are not to be construed as limiting the technical solutions of the present disclosure. Shapes and sizes of various components in the accompanying drawings do not reflect true proportions, the purpose of which is merely illustrative of the disclosure.

DETAILED DESCRIPTION

Specific implementations of the present disclosure will be described in further detail below with reference to the accompanying drawings and embodiments. The following embodiments are intended to illustrate the present disclosure, but are not intended to limit the scope of the present disclosure. It is to be noted that the embodiments in the present application and the features in the embodiments can be combined with each other without conflict.

In view of the problems such as complex structure, low aperture rate, and increased cost etc. in the conventional techniques such as capacitive coupling, charge sharing, or 2D1G/2G1D etc., the embodiments of the present disclosure provide a driving method and driving apparatus of a display panel. The display panel according to the embodiments of the present disclosure comprises an array substrate and an opposite substrate which are arranged oppositely, and a liquid crystal layer disposed between the array substrate and the opposite substrate. A main body structure of the array substrate comprises an array structure layer formed on a substrate and a first alignment layer formed on the array structure layer, and a main body structure of the opposite substrate comprises a color film structure layer formed on the substrate and a second alignment layer formed on the color film structure layer, i.e., the first alignment layer and the second alignment layer are located on a side of the array substrate and a side of the opposite substrate facing the liquid crystal layer respectively, so as to enable initial vertical alignment of liquid crystal molecules in the liquid crystal layer. The array structure layer comprises gate lines, data lines and a first common electrode. The plurality of gate lines are arranged in a direction perpendicular to the plurality of data lines to form a plurality of pixel units arranged in a matrix on the array substrate. Each pixel unit comprises a thin film transistor and a pixel electrode. The pixel electrode is insulated from the first common electrode and is overlapped with the first common electrode in a direction perpendicular to the array substrate to form a storage capacitor. The color film structure layer comprises a second common electrode configured to form an electric field together with the pixel electrode when being applied with a voltage, so as to drive the liquid crystal molecules. The initial vertical alignment of the liquid crystal molecules means that an initial alignment direction of the liquid crystal molecules is perpendicular to the array substrate and the opposite substrate, i.e., being perpendicular to a plane of the display panel, when the display panel is not driven. Further, the pixel electrode in each pixel unit according to the embodiments of the present disclosure is a strip-like electrode having at least one inclination direction, which form at least two liquid crystal molecular regions having different domain inclination directions, and may form at least two pixel regions having different domain inclination directions after a voltage is applied across the pixel electrode and the second common electrode to cause the liquid crystal molecules to be deflected. That is, the pixel unit has at least two domain inclination directions. The domain inclination direction means a small region in which directions of the liquid crystal molecules are substantially the same after the voltage is applied. Factors for deciding the directions of the liquid crystal molecules comprise magnitude of the voltage and an inclination direction of the strip-like electrode. In a specific implementation, the pixel electrode may be set as a strip-like electrode having at least two inclination directions, such as an X-shaped electrode, which forms a pixel unit having at least four domain inclination directions, which pixel unit will be referred to hereinafter as a four-domain pixel unit.

Figure 1:
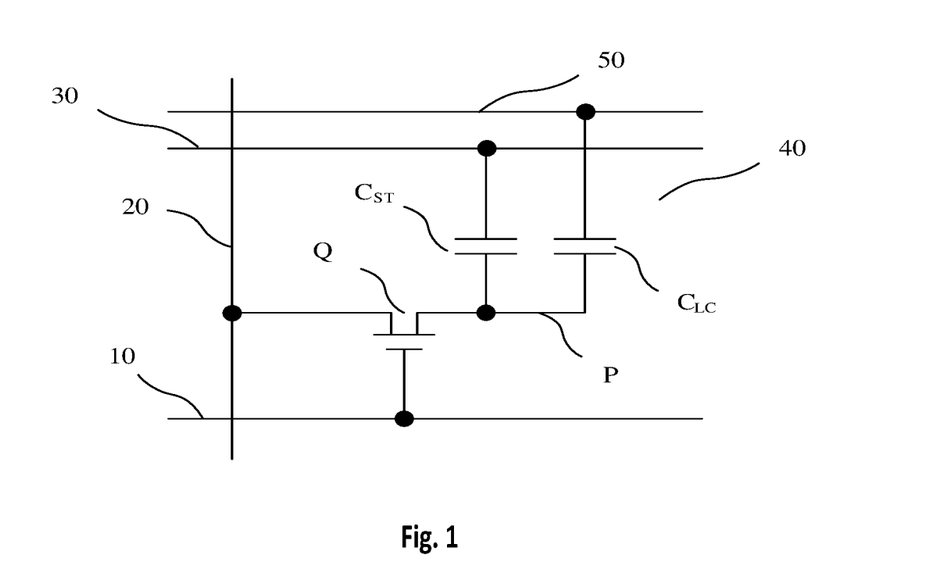
FIG. 1 is an equivalent circuit diagram of a pixel unit on a display panel according to an embodiment of the present disclosure.

FIG. 1 is an equivalent circuit diagram of a pixel unit on a display panel according to an embodiment of the present disclosure. As shown in FIG. 1, the pixel unit 40 is defined by both a gate line 10 and a data line 20. Each pixel unit 40 is located between two adjacent gate lines 10 and between two adjacent data lines 20. A first common electrode 30 is parallel to the gate line 10 and is located between two adjacent gate lines 10. A second common electrode 50 disposed on an opposite substrate is also parallel to the gate line 10 and is located between the two adjacent gate lines 10. The pixel unit 40 comprises a thin film transistor Q and a pixel electrode P. The thin film transistor Q has a gate connected to the gate line 10, a source/drain connected to the data line 20, and a drain/source connected to the pixel electrode P. The pixel electrode P and the first common electrode 30 form a storage capacitor $C_{ST}$, and the pixel electrode P and the second common electrode 50 form a liquid crystal capacitor $C_{LC}$. When the display panel is in operation, a gate line signal transmits a scanning signal and a turn-off signal sequentially to a first gate line, a second gate line, . . . and an $n^{th}$ gate line, and transmission of the scanning signal and the turn-off signal to all of n gate lines is completed within a frame period. When the scanning signal is transmitted to a certain gate line, a thin film transistor Q as a switch is turned on, and a data voltage on a corresponding data line 20 is transmitted to a corresponding pixel electrode P via the thin film transistor Q. When the turn-off signal is transmitted to the gate line, the thin film transistor Q is turned off and transmission of the data voltage on the data line is completed. In the embodiments of the present disclosure, a common voltage in a modulation mode is applied to the first common electrode, so that an average arrangement direction of liquid crystal molecules in a pixel unit changes in a driving period, to realize a display effect of domain doubling and frequency doubling, improve the color washout phenomenon, and overcome a flicker phenomenon.

The technical solutions according to the embodiments of the present disclosure will be described in detail below in conjunction with a plurality of embodiments. In the following embodiments, each pixel unit actually corresponds to a minimum point (pixel point) on the display panel which may be independently displayed, and the display panel comprises a plurality of pixel units arranged in an array. Therefore, when the display panel is driven, an actual driving process is performed simultaneously for the plurality of pixel units, but the following embodiments are described by only taking driving of one pixel unit as an example.

First Embodiment

Figure 2:
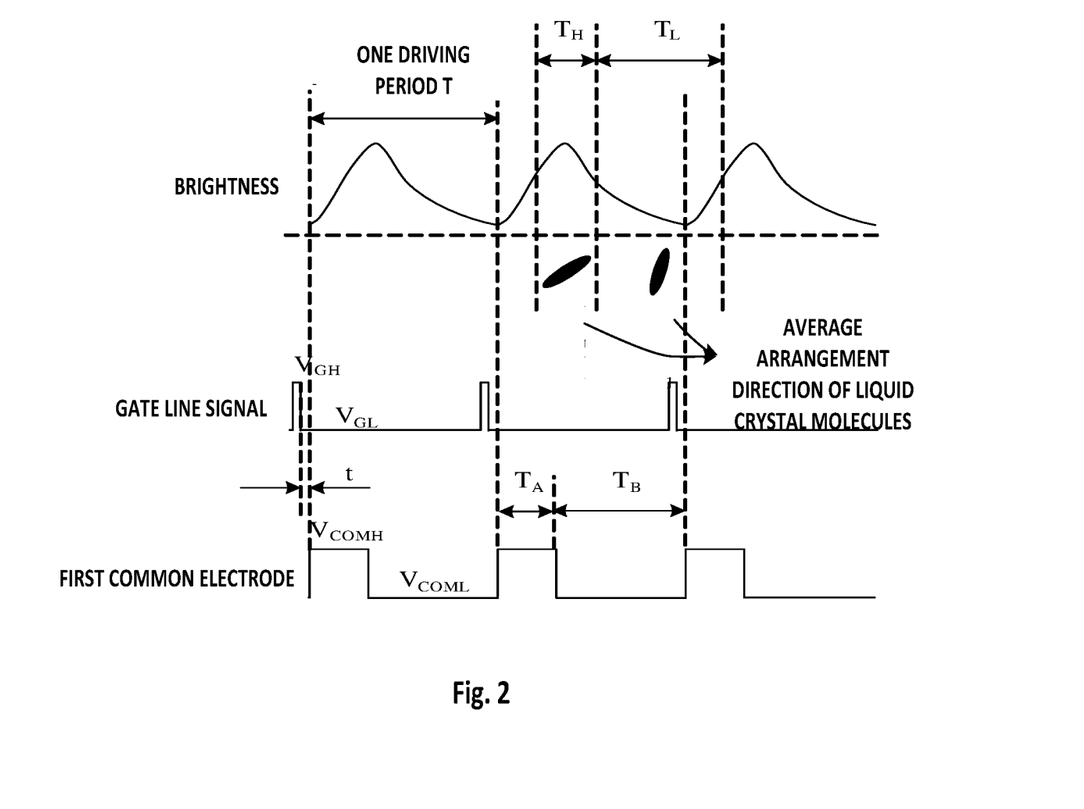
FIG. 2 is a diagram of a driving method of a display panel according to a first embodiment of the present disclosure.

In the present embodiment, a driving period is divided into two time periods which comprise a first time period and a second time period, and a common voltage applied to the first common electrode is in a modulation mode. A high level common voltage is applied as a first common voltage to the first common electrode in the first time period, and a low level common voltage is applied as a second common voltage to the first common electrode in the second time period. FIG. 2 is a diagram of a driving method of a display panel according to the first embodiment of the present disclosure. A sum of duration $T_A$ of the first time period and duration $T_B$ of the second time period is a driving period and the second time period is longer than the first time period in duration. According to an embodiment of the present disclosure, a ratio of $T_A$ to $T_B$ may be set to 1:1.5 to 1:3.

As shown in FIG. 2, in the driving method of a display panel according to the present embodiment, a scanning signal (a high level scanning voltage) $V_{GH}$ is transmitted to the gate line, the thin film transistor Q is turned on, and the data voltage on the data line 20 charges the pixel electrode P via the thin film transistor Q. As the charging of the pixel electrode can be completed in a very short time, a turn-on signal for the charging operation lasts for a short time, which is usually in the order of several microseconds to several tens of microseconds. After that, a turn-off signal (a low level scanning voltage) $V_{GL}$ is transmitted to the gate line, the thin film transistor Q is turned off, and charging by the data voltage on the data line is completed. After the thin film transistor is turned off, a high level common voltage $V_{COMH}$ is applied to the first common electrode for duration $T_A$, so that deflection of the liquid crystal molecules gradually increases, and brightness of the pixel unit gradually increases. After that, the voltage applied to the first common electrode decreases from the high level common voltage $V_{COMH}$ to a low level common voltage $V_{COML}$ which is applied for duration $T_B$. Due to the change of the voltage applied to the first common electrode, a voltage on the pixel electrode P is induced to decrease through a coupling effect of the storage capacitor $C_{ST}$, so that the deflection of the liquid crystal molecules gradually decreases and the brightness of the pixel unit gradually decreases. That is, the average arrangement direction of the liquid crystal molecules in the pixel unit changes and the brightness of the pixel unit changes in a driving period. From the perspective of the liquid crystal molecules, a deflection angle of the liquid crystal molecules gradually increases after the high level common voltage $V_{COMH}$ is applied to the first common electrode, and the average deflection angle of the liquid crystal molecules is θ1 in the time period $T_A$, and the deflection angle of the liquid crystal molecules gradually decreases after the low level common voltage $V_{COML}$ is applied to the first common electrode, and the average deflection angle of the liquid crystal molecules is θ2 in the time period $T_B$, wherein θ1 is greater than θ2. Therefore, the average arrangement directions of the liquid crystal molecules in the two time periods $T_A$ and $T_B$ are different. That is, the average arrangement direction of the liquid crystal molecules changes with the change of the common voltage. After that, the scanning signal $V_{GH}$ is transmitted to the gate line, and the process proceeds to a next frame period, until the display ends. In the present embodiment, a frame period refers to a time period between rising edges (or falling edges) of adjacent scanning signals $V_{GH}$ of gate lines, and a driving period refers to a time period between rising edges of adjacent high level common voltages $V_{COMH}$, wherein a driving period is equal to a frame period in value. In the present embodiment, a time difference between a rising edge of the high level common voltage $V_{COMH}$ of the first common electrode and a falling edge of the turn-off signal $V_{GL}$ of the gate line is t.

In the present embodiment, a driving period is divided into two time periods, and a common voltage on the first common electrode is in a modulation mode and is adjusted from the high level common voltage $V_{COMH}$ in the first time period to the low level common voltage $V_{COML}$ in the second time period, so that the average arrangement direction of the liquid crystal molecules in the pixel unit changes in a driving period to realize a display effect of domain doubling. For example, for a four-domain pixel unit, with the driving method according to the present embodiment, the pixel unit has a four-domain display effect in the first time period and has another four-domain display effect in the second time period, i.e., under the driving of the common voltage in a modulation mode, liquid crystal molecules corresponding to each domain have two different average arrangement directions in two time periods, so that the pixel unit realizes an eight-domain display effect in a driving period. In practice, in the driving method according to the present embodiment, a number of domains of the pixel unit is doubled in a "time division" manner. The increase in the number of domains not only effectively improves the color washout phenomenon, but also significantly improves the multi-domain display effect.

In the present embodiment, if a ratio of duration of the first time period to duration of the second time period is set to 1:2, a time period during which the pixel unit is at low brightness is twice as large as a time period during which the pixel unit is at high brightness, which realizes a display effect of dividing the pixel unit into two sub-pixels. The pixel unit acts as a primary sub-pixel which is displayed at the high brightness in the high brightness time $T_H$, and acts as a secondary sub-pixel which is displayed at the low brightness in the low brightness time $T_L$. The low brightness time $T_L$ of the pixel unit is about twice as large as the high brightness time $T_H$, which means that an area of the secondary sub-pixel is about twice as large as an area of the primary sub-pixel in the two sub-pixels into which the pixel unit is divided. In practice, in the driving method according to the present embodiment, the pixel unit is displayed as the primary sub-pixel and the secondary sub-pixel in the "time division" manner, so that respective liquid crystal molecules corresponding to the two sub-pixels have different average arrangement directions, and different light transmittance result in different brightness, which can further improve the color washout phenomenon.

In the present embodiment, a driving period is divided into two time periods, and a common voltage on the first common electrode is in a modulation mode and is adjusted from the high level common voltage $V_{COMH}$ in the first time period to the low level common voltage $V_{COML}$ in the second time period, so that the brightness of the pixel unit changes in a driving period to realize a display effect of frequency doubling. For example, if a refresh frequency of the gate line signal is 60 Hz, with the driving method according to the present embodiment, brightness of the pixel unit changes from high to low once in a driving period of 16.7 ms, which is equivalent to one refresh operation. Therefore, in the present embodiment, if a change frequency of brightness of the display panel is 120 Hz, it means that the refresh frequency of the gate line signal is 120 Hz. The increase in the refresh frequency can effectively overcome the flicker phenomenon.

In the present embodiment, a driving period is divided into two time periods, a common voltage on the first common electrode is in a modulation mode, and polarity reversal of the pixel unit is realized at the same time. Although the present embodiment has been described only by taking polarity reversal of a pixel unit in a driving period as an example, the polarity reversal is performed for each of pixel units in the entire display panel, and therefore there may be diverse polarity reversal manners of the display panel. For example, frame reversal, column reversal, row reversal etc. are feasible. For example, in a driving period, common voltages in the same driving mode are applied to respective first common electrodes of various pixel units to realize a frame reversal manner. In a driving period, common voltages in opposite driving modes are applied to two adjacent rows of pixel units to realize a row reversal manner. In a driving period, common voltages in opposite driving modes are applied to two adjacent columns of pixel units to realize a column reversal manner. In a driving period, common voltages in opposite driving modes are applied to two adjacent pixel units to realize a point reversal manner. It is to be understood that the "polarity" referred to in the present embodiment is not relative to a ground voltage, but is relative to the data voltage on the data line. If the common voltage is positive, it indicates that the common voltage is greater than the data voltage, and if the common voltage is negative, it indicates that the common voltage is less than the data voltage. That is, the polarity of the pixel unit is the polarity of the common voltage of the pixel unit relative to the data voltage of the pixel unit.

In practical implementations, the ratio of the duration $T_A$ of the first time period to the duration $T_B$ of the second time period may be set according to practical requirements. For example, $T_A:T_B$ may be set to 1:1.5, 1:2, 1:2.5, 1:3 etc., and the time difference t may be set to a time period during which a row of gate line is turned on, or an interval between times when adjacent rows of gate lines are turned on.

In practical implementations, the solution according to the present embodiment may also be extended accordingly. For example, the first common voltage may be set to a low level common voltage in the first time period, and the second common voltage may be set to a high level common voltage in the second time period, i.e., the brightness of the pixel unit gradually decreases in the first time period and the brightness of the pixel unit gradually increases in the second time period. Accordingly, the ratio of the duration $T_A$ of the first time period to the duration $T_B$ of the second time period is set to 1.5:1 to 3:1. In addition, the common voltage applied to the second common electrode may be in a constant mode, and also may be set to change correspondingly in different frames depending on specific conditions.

The embodiments of the present disclosure can be applied to a pixel structure having a low number of domains, and the number of domains of the pixel unit is doubled in the time division manner without increasing the complexity of the structure, reducing the aperture ratio and increasing the manufacturing cost. Therefore, the present disclosure has a wide range of application prospects.

Second Embodiment

Figure 3:
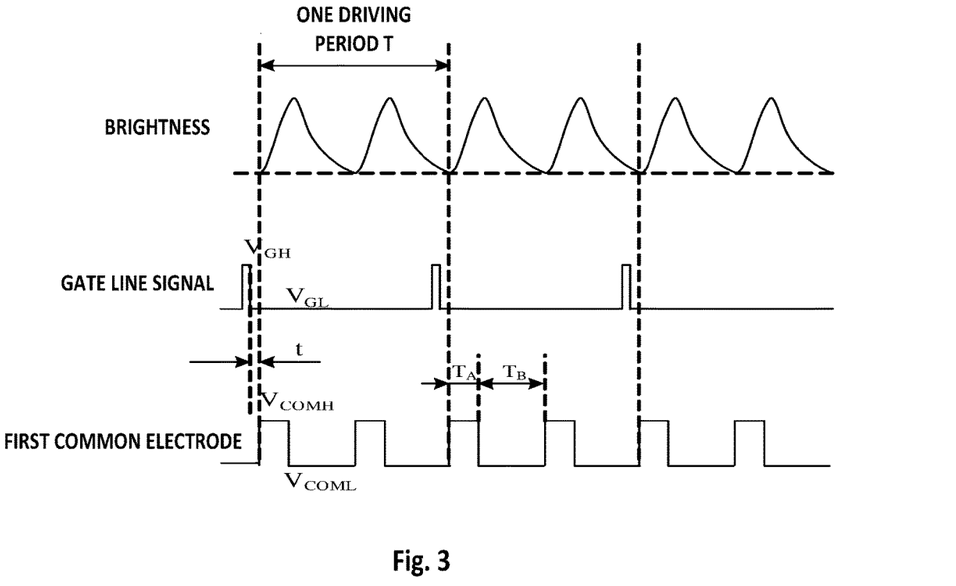
FIG. 3 is a diagram of a driving method of a display panel according to a second embodiment of the present disclosure.

The present embodiment is an extension based on the first embodiment, and differs from the first embodiment in that in the present embodiment, a driving period is divided into two sub-periods, each of which is further divided into two time periods that comprise a first time period and a second time period, and a common voltage applied to the first common electrode is in a modulation mode. FIG. 3 is a diagram of a driving method of a display panel according to the second embodiment of the present disclosure. A sum of duration $T_A$ of the first time period and duration $T_B$ of the second time period is a half of a driving period and the second time period is longer than the first time period in duration. According to an embodiment of the present disclosure, a ratio of $T_A$ to $T_B$ may be set to 1:1.5 to 1:3.

As shown in FIG. 3, in the driving method of a display panel according to the present embodiment, after the gate line is turned off, in the first sub-period, a high level common voltage $V_{COMH}$ is applied to the first common electrode for duration $T_A$, so that deflection of the liquid crystal molecules gradually increases, and brightness of the pixel unit gradually increases. After that, the voltage applied to the first common electrode decreases from the high level common voltage $V_{COMH}$ to a low level common voltage $V_{COML}$ which is applied for duration $T_B$. Due to the change of the voltage applied to the first common electrode, a voltage on the pixel electrode PA is induced to decrease through a coupling effect of the storage capacitor $C_{ST}$, so that the deflection of the liquid crystal molecules gradually decreases and the brightness of the pixel unit gradually decreases. After that, in the second sub-period, the modulation mode in the first sub-period is repeated for the first common electrode, so that the deflection of the liquid crystal molecules changes from gradually increasing to gradually decreasing and the brightness of the pixel unit changes from gradually increasing to gradually decreasing. That is, the brightness of the pixel unit changes twice in a driving period.

In the present embodiment, a driving period is divided two sub-periods, each of which is further divided into two time periods, and a common voltage on the first common electrode is in a modulation mode and is adjusted from the high level common voltage $V_{COMH}$ in the first time period to the low level common voltage $V_{COML}$ in the second time period, so that the brightness of the pixel unit changes twice in a driving period to realize a display effect of frequency doubling. For example, if a refresh frequency of the gate line signal is 60 Hz, with the driving method according to the present embodiment, a change frequency of the brightness of the pixel unit is 180 Hz, which means that the refresh frequency of the gate line signal is 180 Hz, thereby effectively overcoming the flicker phenomenon.

In addition, in the present embodiment, a display effect of domain doubling and a display effect of two sub-pixels in each sub-period of a driving period are realized. That is, a number of domains of the pixel unit is increased in a "time division" manner, and the pixel unit is displayed as a primary sub-pixel which is displayed at high brightness and as a secondary sub-pixel which is displayed at low brightness in the "time division" manner. For example, if a structure of the pixel unit is provided with four domains, the pixel unit according to the present embodiment can realize an eight-domain display effect in the first sub-period and the second sub-period, respectively, which not only effectively improves the color washout phenomenon, but also significantly improves the multi-domain display effect. Meanwhile, in the present embodiment, polarity reversal of the pixel unit is realized. The display effect of domain doubling, the display effect of two sub-pixels and the polarity reversal etc. are the same as those in the first embodiment, and will not be repeated here.

In practical implementations, the solutions according to present embodiment can also be extended in a variety of ways. For example, a driving period may be divided into three sub-periods, each of which is further divided into a first time period and a second time period, so that the brightness of the pixel unit changes three times. Alternatively, a driving period may be divided into four sub-periods, each of which is further divided into a first time period and a second time period, so that the brightness of the pixel unit changes four times.

Third Embodiment

In the first and second embodiments described above, the high level common voltage is applied after the gate line is turned off. That is, a rising edge of the high level common voltage on the first common electrode lags behind a falling edge of the turn-off signal of the gate line by the time difference t. Such driving manner in the embodiments described above is characterized in that after charging of the pixel electrode is completed, a voltage variation on the pixel electrode is induced by the coupling effect of the storage capacitor using the common voltage in the modulation mode. The third embodiment differs from the first embodiment in that in the present embodiment, the high level common voltage is applied as the first common voltage before the gate line is turned on. That is, the rising edge of the high level common voltage is ahead of a rising edge of a turn-on signal of the gate line by the time difference t. This driving manner in the present embodiment is characterized in that as the voltage applied to the first common electrode has been changed from the low level common voltage to the high level common voltage and the voltage on the pixel electrode changes from a decreasing inclination to an increasing inclination before the pixel electrode is charged, after the gate line is turned on, a charging delay of the pixel electrode is reduced, thereby improving the charging efficiency.

Figure 4:
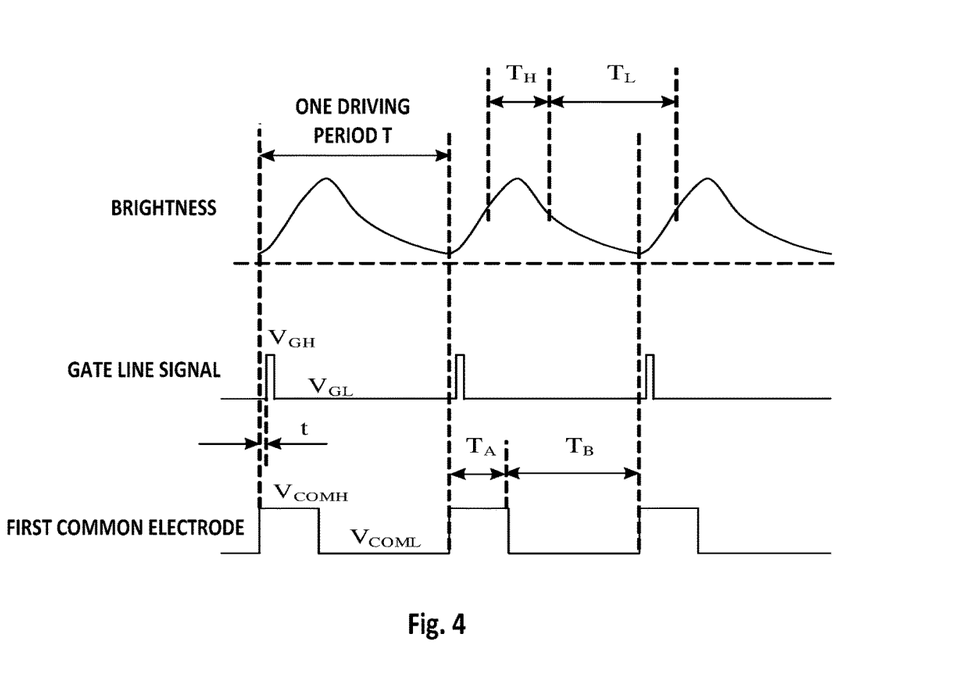
FIG. 4 is a diagram of a driving method of a display panel according to a third embodiment of the present disclosure.
Figure 5:
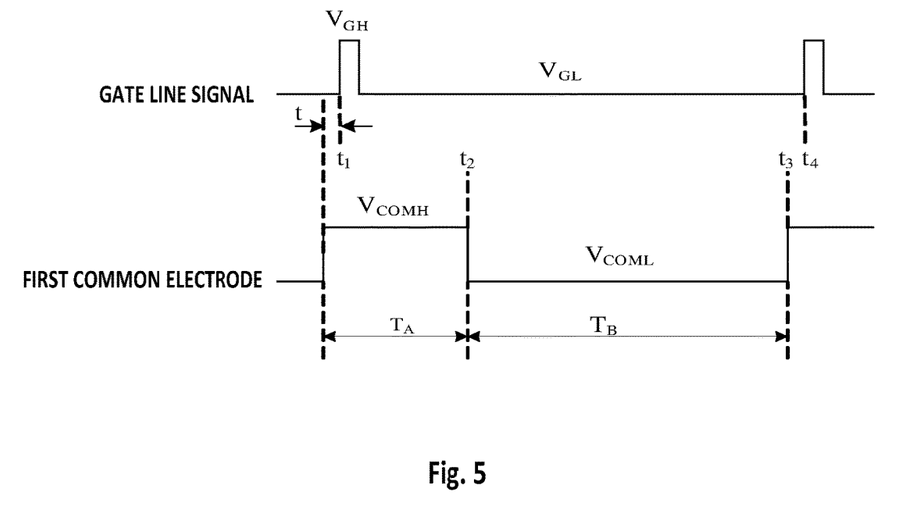
FIG. 5 is a timing diagram of a driving method of a display panel according to the third embodiment of the present disclosure.

FIG. 4 is a diagram of a driving method of a display panel according to the third embodiment of the present disclosure. FIG. 5 is a timing diagram of the driving method of a display panel according to the third embodiment of the present disclosure. As shown in FIG. 4, in the present embodiment, a driving period is divided into two time periods which comprise a first time period and a second time period, and a common voltage applied to the first common electrode is in a modulation mode. A high level common voltage is applied to the first common electrode in the first time period, and a low level common voltage is applied to the first common electrode in the second time period. A sum of duration $T_A$ of the first time period and duration $T_B$ of the second time period is a driving period and the second time period is longer than the first time period in duration. According to an embodiment of the present disclosure, a ratio of $T_A$ to $T_B$ may be set to 1:1.5 to 1:3.

As shown in FIG. 5, in the driving method of a display panel according to the present embodiment, in a first timing t1, a scanning signal (a high level scanning voltage) $V_{GH}$ is transmitted to the gate line, the thin film transistor Q is turned on, and the data voltage on the data line charges the pixel electrode P via the thin film transistor Q. After that, a turn-off signal (a low level scanning voltage) $V_{GL}$ is transmitted to the gate line, the thin film transistor Q is turned off, and charging by the data voltage on the data line is completed. At a second timing $t_2$ later, $t_2=t_1+T_A-t$, the voltage applied to the first common electrode decreases from the high level common voltage $V_{COMH}$ to a low level common voltage $V_{COML}$, so that the deflection of the liquid crystal molecules gradually decreases and the brightness of the pixel unit gradually decreases. At a third timing $t_3$, $t_3=t_2+T_B=t_1-T_A+T_B-t$, the voltage applied to the first common electrode changes from the low level common voltage $V_{COML}$ to the high level common voltage $V_{COMH}$, so that the deflection of the liquid crystal molecules gradually increases and the brightness of the pixel unit gradually increases. At a fourth timing $t_4$, $t_4=t_3+t=t_1+T_A+T_B=t_1-T$, the scanning signal $V_{GH}$ is transmitted to the gate line, and the process proceeds to a next frame period. In the foregoing description, T is duration of a driving period, $T_A$ is duration of the first time period, $T_B$ is duration of the second time period, t is a time difference between the rising edge of the turn-on signal of the gate line and the rising edge of the high level common voltage on the first common electrode, $T_A+T_B=T$ and $T_A:T_B=1:1.5\sim1:3$.

In the present embodiment, a driving period is divided into two time periods, so that the average arrangement direction of the liquid crystal molecules in the pixel unit changes in a driving period to realize a display effect of domain doubling, and the brightness of the pixel unit changes in a driving period to realize a display effect of frequency doubling. Meanwhile, polarity reversal of the pixel unit is realized. Further, a ratio of the duration of the first time period to the duration of the second time period is set to 1:1.5 to 1:3, so that a time period during which the pixel unit is at low brightness may be about 1.5 to 3 times as large as a time period during which the pixel unit is at high brightness, to realize a display effect of dividing the pixel unit into two sub-pixels. The present embodiment not only effectively improves the color washout phenomenon and effectively overcomes the flicker phenomenon, but also significantly improves the multi-domain display effect.

In the present embodiment, the display effect of domain doubling, the display effect of two sub-pixels and the polarity reversal etc. are the same as those in the first embodiment, and will not be repeated here.

Fourth Embodiment

Figure 6:
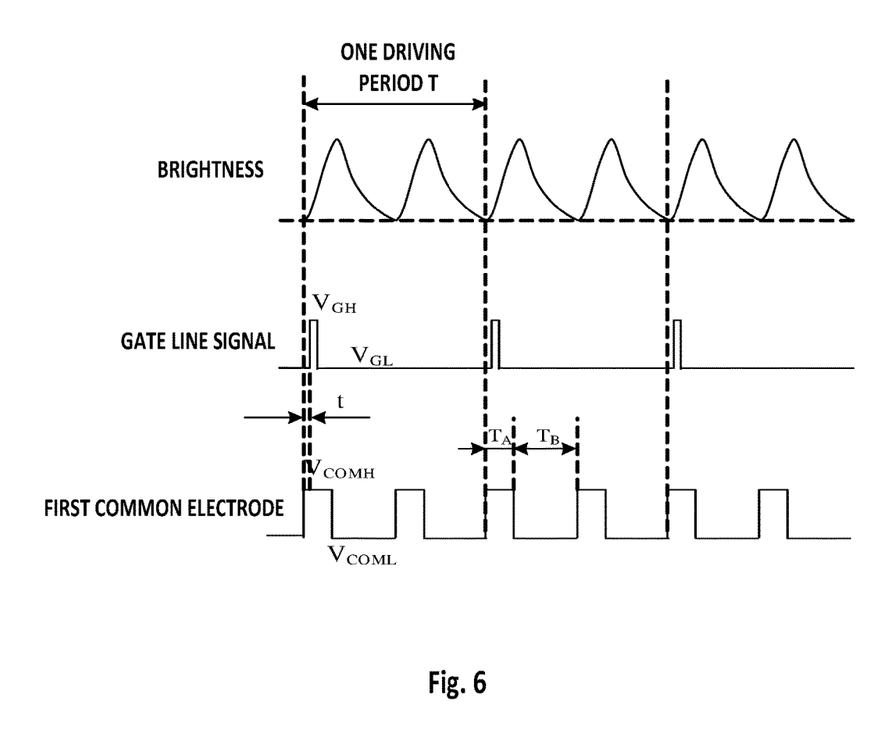
FIG. 6 is a diagram of a driving method of a display panel according to a fourth embodiment of the present disclosure.

The present embodiment is an extension based on the third embodiment, and differs from the third embodiment in that in the present embodiment, a driving period is divided into two sub-periods, each of which is further divided into two time periods that comprise a first time period and a second time period, and a common voltage applied to the first common electrode is in a modulation mode. FIG. 6 is a diagram of a driving method of a display panel according to the fourth embodiment of the present disclosure. A sum of duration $T_A$ of the first time period and duration $T_B$ of the second time period is a half of a driving period and the second time period is longer than the first time period in duration. According to an embodiment of the present disclosure, a ratio of $T_A$ to $T_B$ may be set to 1:1.5 to 1:3.

As shown in FIG. 6, in the driving method of a display panel according to the present embodiment, in a first timing t1, a scanning signal (a high level scanning voltage) $V_{GH}$ is transmitted to the gate line, the thin film transistor Q is turned on, and the data voltage on the data line charges the pixel electrode P via the thin film transistor Q. After that, a turn-off signal (a low level scanning voltage) $V_{GL}$ is transmitted to the gate line, the thin film transistor Q is turned off, and charging by the data voltage on the data line is completed. At a second timing t2 later, $t_2=t_1+T_A-t$, the voltage applied to the first common electrode decreases from the high level common voltage $V_{COMH}$ to a low level common voltage $V_{COML}$, so that the deflection of the liquid crystal molecules gradually decreases and the brightness of the pixel unit gradually decreases. At a third timing t3, $t_3=t_2+T_B=t_1+T_A+T_B-t=t_1+\frac{1}{2}T-t$, the voltage applied to the first common electrode changes from the low level common voltage $V_{COML}$ to the high level common voltage $V_{COMH}$, so that the deflection of the liquid crystal molecules gradually increases and the brightness of the pixel unit gradually increases. At a fourth timing t4, $t_4=t_3+T_A$, the voltage applied to the first common electrode decreases from the high level common voltage $V_{COMH}$ to the low level common voltage $V_{COML}$ so that the deflection of the liquid crystal molecules gradually decreases and the brightness of the pixel unit gradually decreases. At a fifth timing t5, $t_5=t_4+T_B=t_3+T_A+T_B=t_3+\frac{1}{2}T=t_1+T-t$, the voltage applied to the first common electrode is changed from the low level common voltage $V_{COML}$ to the high level common voltage $V_{COMH}$, so that the deflection of the liquid crystal molecules gradually increases and the brightness of the pixel unit gradually increases. At a sixth timing t6, $t_6=t_5+t=t_1+T$, the scanning signal $V_{GH}$ is transmitted to the gate line, and the process proceeds to a next frame period. In the foregoing description, T is duration of a driving period, $T_A$ is duration of the first time period, $T_B$ is duration of the second time period, t is a time difference between the rising edge of the turn-on signal of the gate line and the rising edge of the high level common voltage on the first common electrode, $T_A+T_B=\frac{1}{2}T$ and $T_A:T_B=1:1.5\sim1:3$.

In the present embodiment, a driving period is divided two sub-periods, each of which is further divided into two time periods, and a common voltage on the first common electrode is in a modulation mode and is adjusted from the high level common voltage $V_{COMH}$ in the first time period to the low level common voltage $V_{COML}$ in the second time period, so that the brightness of the pixel unit changes twice in a driving period to realize a display effect of frequency doubling. Meanwhile, in the present embodiment, a display effect of domain doubling in each sub-period of a driving period and a display effect of two sub-pixels are realized. Further, polarity reversal of the pixel unit is also realized. The display effect of domain doubling, the display effect of two sub-pixels and the polarity reversal etc. are the same as those in the above embodiments, and will not be repeated here.

Similarly, the solutions according to present embodiment can also be extended in a variety of ways. For example, a driving period may be divided into three sub-periods, each of which is further divided into a first time period and a second time period, so that the brightness of the pixel unit changes three times. Alternatively, a driving period may be divided into four sub-periods, each of which is further divided into a first time period and a second time period, so that the brightness of the pixel unit changes four times.

Fifth Embodiment

On the basis of the technical solutions according to the embodiments described above, the present embodiment further provides a driving apparatus of a display panel for implementing the driving method according to the embodiments described above. In the present embodiment, the display panel comprises an array substrate, an opposite substrate and a liquid crystal layer disposed between the array substrate and the opposite substrate. Each of a side of the array substrate and a side of the opposite substrate facing the liquid crystal layer has an alignment layer disposed thereon. The alignment layer is configured to enable initial vertical alignment of liquid crystal molecules in the liquid crystal layer. The array substrate comprises a pixel electrode and a first common electrode, and the pixel electrode is insulated from the first common electrode and is overlapped with the first common electrode in a direction perpendicular to the array substrate. The opposite substrate comprises a second common electrode, and the second common electrode and the pixel electrode are configured to drive the liquid crystal molecules when being applied with a voltage. In addition, the pixel unit has at least two domain inclination directions. The driving apparatus of a display panel according to the present embodiment comprises:

a gate line driving circuit configured to provide a scanning signal and a turn-off signal to a gate line;

a data driving circuit configured to transmit a data voltage to the pixel electrode through the data line when the thin film transistor is turned on, a time division circuit configured to divide a driving period into N sub-periods, each of which is further divided into a first time period and a second time period, where N is a positive integer greater than or equal to 1; and a common electrode driving circuit configured to apply a first common voltage to the first common electrode in the first time period and apply a second common voltage to the first common electrode in the second time period.

In the present embodiment, a driving period may be divided into one, two, three, or more sub-periods. When there is one sub-period, a sum of duration $T_A$ of the first time period and duration $T_B$ of the second time period is a driving period; when there are two sub-periods, the sum of the duration $T_A$ of the first time period and the duration $T_B$ of the second time period in each sub-period is a half of a driving period. The second time period is longer than the first time period in duration. According to an embodiment of the present disclosure, a ratio of $T_A$ to $T_B$ may be set to 1:1.5 to 1:3. The ratio may be deduced similarly when there are three or more sub-periods. According to an embodiment of the present disclosure, the first common voltage is a high level common voltage and the second common voltage is a low level common voltage.

In the present embodiment, the first common voltage may be applied to the common electrode driving circuit after the gate line driving circuit receives a turn-off signal, i.e., a rising edge of the first common voltage lags behind a falling edge of the turn-off signal by a time difference t. Alternatively, the first common voltage may be applied to the common electrode driving circuit before the gate line driving circuit receives a scanning signal, i.e., a rising edge of the scanning signal lags behind the rising edge of the first common voltage by the time difference t.

In practical implementations, the above modules may be independent elements, or may also be integrated. For example, the data driving module may be a data driver Integrated Circuit (IC), and the gate line driving module and the common electrode driving module may be a gate driver IC.

The time division module is provided in the driving apparatus of a display panel according to the present embodiment to realize a display effect of domain doubling, a display effect of frequency doubling, a display effect of two sub-pixels, and polarity reversal etc. The technical principle thereof has been described in detail in the embodiments described above and will not be repeated here.

Sixth Embodiment

On the basis of the technical solutions according to the embodiments described above, the present embodiment further provides a display apparatus comprising the driving apparatus of a display panel described above. The display apparatus may be any product or component having a display function such as a mobile phone, a tablet computer, a television set, a display, a notebook computer, a digital photo frame, a navigator etc.

In the description of the embodiments of the present disclosure, it is to be understood that an azimuth or positional relationship indicated by the terms "middle", "upper", "lower", "front", "rear", "vertical", "horizontal", "top", "bottom", "inside", "outside" etc. is an azimuth or positional relationship shown in the accompanying drawings only for the purpose of facilitating the description and simplification of the description rather than indicating or implying that the apparatus or element must have a specific orientation, or must be constructed and operate in a specific orientation, and therefore cannot be construed as limiting the present disclosure.

In the description of the embodiments of the present disclosure, it is to be understood that unless otherwise specified and defined, the terms "install", "connect with" and "connect to" should be broadly understood as, for example, "fixedly connected", "detachably connected", or "integrally connected"; or may also be "mechanically connected" or "electrically connected"; or may also be "directly connected", "indirectly connected through an intermediary", or "internally connected between two elements". It will be apparent to those of ordinary skilled in the art that the specific meaning of the above terms in the present disclosure may be understood according to specific conditions.

For clarity of the description, the terms such as "first" and "second" etc. in the present disclosure are used to distinguish between similar items, and do not limit the present disclosure in number, but is only used to describe a preferred manner by way of example. Variations or related extensions which are readily apparent to those skilled in the art according to the content of the present disclosure are intended to be within the protection scope of the present disclosure.

It will be understood by those of ordinary skill in the art that all or a part of the flows in the method according to the embodiments described above may be accomplished by a computer program instructing related hardware. The program may be stored in a computer readable storage medium, and when the program is executed, the flows of the various embodiments of the method described above may be included. The storage medium may be a magnetic disk, an optical disk, a Read-Only Memory (ROM), or a Random Access Memory (RAM) etc.

While the embodiments disclosed in the present disclosure are described above, the description is for ease of understanding of the present disclosure and is not intended to limit the present disclosure. Any person skilled in the art to which the present disclosure pertains may make any modifications and variations of the present disclosure in form and detail without departing from the spirit and scope of the present disclosure, but the scope of patent protection of the present disclosure should still be defined by the appended claims.

We claim:

1. A driving method for a display panel, wherein the display panel comprises an array substrate, an opposite substrate and a liquid crystal layer disposed between the array substrate and the opposite substrate, wherein the array substrate has a gate line, a data line and a thin film transistor disposed thereon, the array substrate further comprises a pixel electrode and a first common electrode, the pixel electrode is insulated from the first common electrode and is overlapped with the first common electrode in a direction perpendicular to the array substrate, the opposite substrate comprises a second common electrode, and the second common electrode and the pixel electrode are configured to drive liquid crystal molecules when being applied with a voltage, the driving method comprising:

dividing a driving period into N sub-periods, each of which is further divided into a first time period and a second time period, where N is 3 or 4; and applying a first common voltage to the first common electrode in the first time period and applying a second common voltage to the first common electrode in the second time period, wherein the higher one of the first common voltage and the second common voltage is higher than a data voltage that is transmitted from the data line to the pixel electrode when the thin film transistor is turned on, and the lower one of the first common voltage and the second common voltage is lower than the data voltage, so that the liquid crystal molecules reverse during the driving period.

2. The driving method according to claim 1, wherein the second time period is longer than the first time period in duration.

3. The driving method according to claim 2, wherein a ratio of duration of the first time period to duration of the second time period is between 1:1.5 and 1:3.

4. The driving method according to claim 1, wherein the first common voltage is a high level common voltage, and the second common voltage is a low level common voltage.

5. The driving method according to claim 2, wherein the first common voltage is a high level common voltage, and the second common voltage is a low level common voltage.

6. The driving method according to claim 3, wherein the first common voltage is a high level common voltage, and the second common voltage is a low level common voltage.

7. The driving method according to claim 1, wherein the driving method further comprises:
receiving, by the gate line, a scanning signal;
causing the thin film transistor to be turned on so that the data voltage is transmitted from the data line to the pixel electrode; and
receiving, by the gate line, a turn-off signal,
wherein a rising edge of the first common voltage is after a falling edge of the turn-off signal, or the rising edge of the first common voltage is before a rising edge of the scanning signal.

8. The driving method according to claim 2, wherein the driving method further comprises:
receiving, by the gate line, a scanning signal;
causing the thin film transistor to be turned on so that the data voltage is transmitted from the data line to the pixel electrode; and
receiving, by the gate line, a turn-off signal,
wherein a rising edge of the first common voltage is after a falling edge of the turn-off signal, or the rising edge of the first common voltage is before a rising edge of the scanning signal.

9. The driving method according to claim 3, wherein the driving method further comprises:
receiving, by the gate line, a scanning signal;
causing the thin film transistor to be turned on so that the data voltage is transmitted from the data line to the pixel electrode; and
receiving, by the gate line, a turn-off signal,
wherein a rising edge of the first common voltage is after a falling edge of the turn-off signal, or the rising edge of the first common voltage is before a rising edge of the scanning signal.

10. A driving apparatus of a display panel, wherein the display panel comprises an array substrate, an opposite substrate and a liquid crystal layer disposed between the array substrate and the opposite substrate, wherein the array substrate has a gate line, a data line and a thin film transistor disposed thereon, and the array substrate further comprises a pixel electrode and a first common electrode, the pixel electrode is insulated from the first common electrode and is overlapped with the first common electrode in a direction perpendicular to the array substrate, the opposite substrate comprises a second common electrode, and the second common electrode and the pixel electrode are configured to drive liquid crystal molecules when being applied with a voltage, the driving apparatus comprising:
a time division circuit configured to divide a driving period into N sub-periods, each of which is further divided into a first time period and a second time period, where N is 3 or 4; and
a common electrode driving circuit configured to apply a first common voltage to the first common electrode in the first time period and apply a second common voltage to the first common electrode in the second time period,
wherein the higher one of the first common voltage and the second common voltage is higher than a data voltage that is transmitted from the data line to the pixel electrode when the thin film transistor is turned on, and the lower one of the first common voltage and the second common voltage is lower than the data voltage, so that the liquid crystal molecules reverse during the driving period.

11. The driving apparatus according to claim 10, wherein the second time period is longer than the first time period in duration.

12. The driving apparatus according to claim 11, wherein a ratio of duration of the first time period to duration of the second time period is between 1:1.5 and 1:3.

13. The driving apparatus according to claim 10, wherein the first common voltage is a high level common voltage, and the second common voltage is a low level common voltage.

14. The driving apparatus according to claim 11, wherein the first common voltage is a high level common voltage, and the second common voltage is a low level common voltage.

15. The driving apparatus according to claim 12, wherein the first common voltage is a high level common voltage, and the second common voltage is a low level common voltage.

16. The driving apparatus according to claim 10, wherein the driving apparatus further comprises:
a gate line driving circuit configured to provide a scanning signal and a turn-off signal to the gate line; and
a data driving circuit configured to transmit the data voltage to the pixel electrode through the data line when the thin film transistor is turned on,
wherein a rising edge of the first common voltage is after a falling edge of the turn-off signal, or the rising edge of the first common voltage is before a rising edge of the scanning signal.

17. The driving apparatus according to claim 11, wherein the driving apparatus further comprises:
a gate line driving circuit configured to provide a scanning signal and a turn-off signal to the gate line; and
a data driving circuit configured to transmit the data voltage to the pixel electrode through the data line when the thin film transistor is turned on,
wherein a rising edge of the first common voltage is after a falling edge of the turn-off signal, or the rising edge of the first common voltage is before a rising edge of the scanning signal.

18. The driving apparatus according to claim 12, wherein the driving apparatus further comprises:

a gate line driving circuit configured to provide a scanning signal and a turn-off signal to the gate line; and a data driving circuit configured to transmit the data voltage to the pixel electrode through the data line when the thin film transistor is turned on, wherein a rising edge of the first common voltage is after a falling edge of the turn-off signal, or the rising edge of the first common voltage is before a rising edge of the scanning signal.

19. A display apparatus, comprising the driving apparatus of a display panel according to claim 10.

20. The display apparatus according to claim 19, wherein the driving apparatus further comprises:

a gate line driving circuit configured to provide a scanning signal and a turn-off signal to the gate line; and a data driving circuit configured to transmit the data voltage to the pixel electrode through the data line when the thin film transistor is turned on, wherein a rising edge of the first common voltage is after a falling edge of the turn-off signal, or the rising edge of the first common voltage is before a rising edge of the scanning signal.

\* \* \* \* \*